United States Patent [19]

Ness

[11] Patent Number: 4,878,350
[45] Date of Patent: Nov. 7, 1989

[54] PULSATION DAMPENING DEVICE FOR SUPER CRITICAL FLUID EXPANSION ENGINE, HYDRAULIC ENGINE OR PUMP IN CRYOGENIC SERVICE

[75] Inventor: Leif A. Ness, Macungie, Pa.

[73] Assignee: Air Products and Chemicals, Inc., Allentown, Pa.

[21] Appl. No.: 320,346

[22] Filed: Mar. 8, 1989

[51] Int. Cl.$^4$ ................................................ F17C 7/02
[52] U.S. Cl. ........................................ 62/50.1; 138/26
[58] Field of Search .......................... 62/50.1; 138/26

[56] References Cited

U.S. PATENT DOCUMENTS 3,157,202  11/1964  Sadler et al. ........................... 138/26
3,880,193  4/1975  Lewis ....................................... 62/55

Primary Examiner—Ronald C. Capossela
Attorney, Agent, or Firm—Willard Jones, II; James C. Simmons; William F. Marsh

[57] ABSTRACT

The present invention discloses a surge bottle or pulsation dampening device for cryogenic services which comprises three sections: a liquid sump section comprised of an enclosed area containing a volume of an incompressible fluid; a warm gas volume section comprised of an enclosed area containing a volume of a compressible warm gas; and a laminar flow section which connects and allows for communication between the liquid sump section and the warm gas volume section. The laminar flow section is comprised of a number of small bore, thin walled tubes which contain the incompressible fluid in the end connected to the liquid sump section and the compressible warm gas in the end connected to the warm gas volume section. The bore of the tubes in the laminar flow section are such that any movement of either the compressible warm gas or the incompressible fluid in the tubes would be laminar.

2 Claims, 2 Drawing Sheets

PULSATION DAMPENING DEVICE FOR SUPER CRITICAL FLUID EXPANSION ENGINE, HYDRAULIC ENGINE OR PUMP IN CRYOGENIC SERVICE

TECHNICAL FIELD

The present invention relates to a device which dampens pressure pulsations of super critical cryogenic fluids during operation of an engine or pump.

BACKGROUND OF THE INVENTION

The production of liquefied gas usually consists of gas compression, cooling, and expansion through a value to produce a cryogenic liquid. This basic Joule-Thompson cycle is generally used today, but, because the expansion through a valve is at constant enthalpy and thus zero isentropic efficiency, greater liquid production could be achieved with a device that can extract work from the expanding fluid. Expansion engines and expansion turbines have been used extensively to expand gases within their superheat region, but few applications have been extended into the liquid region.

The problem of operating an expansion with a super critical fluid is the fact that the fluid is single phase and behaves with compressibility similar to water, i.e., it has little to no compressibility, and therefore, results in the large pressure pulsations in an expansion engine inlet line.

SUMMARY OF THE INVENTION

The present invention is a surge bottle or pressure pulsation dampening device for cryogenic services which comprises three sections. A liquid sump section, wherein the liquid sump seciton is comprised of an enclosed area containing a volume of an incompressible fluid. A warm gas volume section, wherein the warm gas volume section is comprised of an enclosed area containing a volume of a compressible warm gas. Finally, a laminar flow section which connects and allows for communication between the liquid sump section and the warm gas volume section. The laminar flow section is comprised of a number of small bore, thin walled tubes which contain the incompressible fluid in the end connected to the liquid sump section and the compressible warm gas in the end connected to the warm gas volume section. The bore of the tubes in the laminar flow section are such that any movement of either the compressible warm gas or the incompressible fluid would be laminar. During operation of the device, i.e., each stroke of a engine such as an expansion engine, the incompressible fluid and the warm compressible gas within the samll bore, thin walled tubes move or oscillate a short distance in each of the tubes with minimal intermixing. This minimizing of intermixing between incompressible fluid and the warm compressible gas minimizes heat leak from the warm gas volume section to the liquid sump section into the liquid in the sump. For preferred operation of the device, the warm gas temperature should be is at least 55° C. warmer than the incompressible fluid temperature.

DETAILED DESCRIPTION OF THE INVENTION

The cryogenic industry depends upon the production of liquefied gases as one of its major products. The process of liquefying gases usually consists of raising the pressure of the gas with a compressor, cooling the compressed gas to near ambient temperature and then expanding the gas to a lower pressure and lower temperature. By various means of cascade cooling, heat exchange and expansion devices the gas can be liquefied. It is a common practice in the cryogenic industry to use expansion machines (i.e., expansion engines or turbo expanders) to perform the expansion process since the machine will extract energy and thus obtain more cooling than by expansion through a valve.

The compression phase of the above-described process and most of the expansion phase of the process is conducted in the gaseous or superheat state of the fluid and this is where most of the refrigeration takes place. The actual liquefaction of the gas takes place by expanding a precooled high pressure gas or critical fluid to a lower pressure within the saturated mixture phase of the fluid.

The liquid producing expansion process is generally performed with a valve due to complexities of a machine and system having two phase (gas-liquid) flow. With the advent of higher power costs and the incentive for better effiency in the liquefication process there is a need to replace the expansion valve with an expander. For hydrogen, it has been determined that a reciprocating piston expander design would provide better efficiency than a turbo expander design and would also be more amenable to the two phase fluid flow. The engine operation and thermodynamic performance have met the design goals, fulfilling the objective of specific power reduction in the process of producing liquid hydrogen.

The expansion of gases in the superheat phase is well understood and performed routinely. The process can be monitored for pressure and temperature and the efficiency of the expansion can be readily determined. The fluid is a gas and is predictable with its properties well documented. The expansion of a subcooled critical fluid is not as well documented and is not readily monitored for performance with data taken from within the saturated mixture phase (liquid-vapor region).

Figure 1:
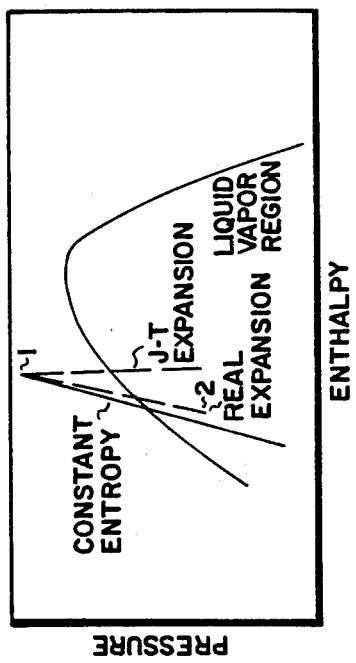
FIG. 1 is a pressure-enthalpy diagram for the expansion of a warm gas.
Figure 2:
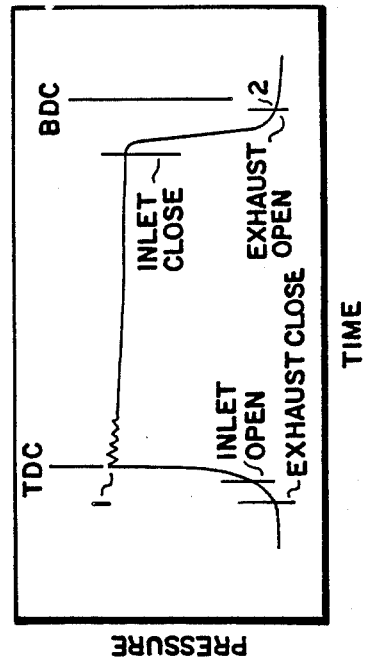
FIG. 2 is a plot of pressure versus time for the expansion of a warm gas.

A comparison of the two expansion cycles shown on the pressure-enthalpy diagram is useful to visualize the difference in the state of the fluids. Coordinated with the pressure-enthalpy diagrams is the pressure-time indicator cards of an expansion guide for the two cycles. FIG. 1 shows the expansion of a high pressure, high temperature gas from position 1 to a low pressure, low temperature gas at position 2. This expansion process could be as a Joule-Thompson expansion through a valve at zero percent efficiency or as an expansion along the constant entropy line at one hundred percent efficiency. Most expanders used in industry today achieve 70 to 90 efficiency. FIG. 2 shows the same expansion process as seen within the engine cylinder using a pressure measuring transducer signal and an oscilloscope with a time base. The engine valve action is shown and is an important criteria in achieving optimum efficiency.

Figure 3:
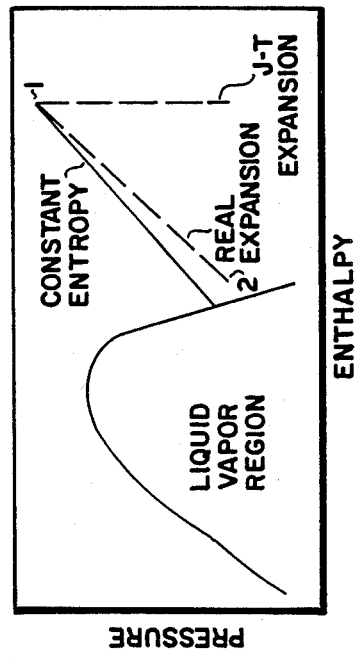
FIG. 3 is a pressure-enthalpy diagram for the expansion of a dense (super critical) fluid.
Figure 4:
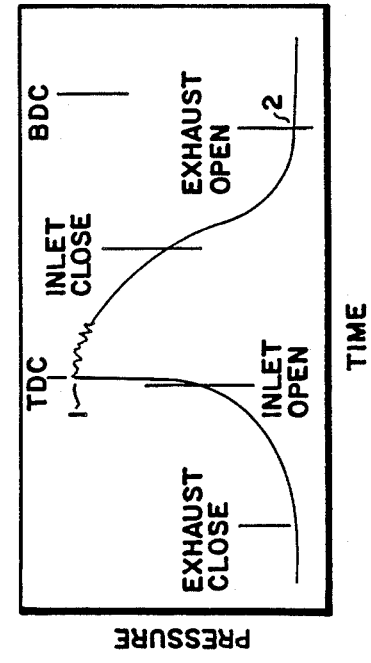
FIG. 4 is a plot of pressure versus time for the expansion of a dense (super critical) fluid.

FIG. 3 shows the expansion process of a subcooled critical fluid with the expansion going from point 1 to point 2. The constant entropy lines have a steeper slope in this phase of the fluid which points out the challenge of achieving a large amount of enthalpy reduction or energy removal from the fluid. Even though the energy removal is minimal, the enthalpy reduction is at a very low temperature. FIG. 4 shows the critical fluid expansion process as seen within the engine cylinder. Notice the full charging cycle and minimum expansion period. The fluid is basically a liquid in its precooled high pressure "critical fluid" state and experiences little or no true expansion within the cylinder until the inlet valve is closed. At that time the fluid expands from point 1 to point 2 very rapidly and changes phase producing cold liquid and cold gas. The high pressure critical fluid does work on the piston through the full stroke just as a piston does work on the fluid in an hydraulic pump.

It is not possible to determine the enthalpy reduction and thus the expansion efficiency due to the constant temperature-pressure relationship within the saturated mixture phase. Instead the engine preformance must be determined by the shaft work produced or by the overall process plant performance. This engine was tested several ways to determine its performance as follows:

1. Compressor recycle gas flow was reduced 7% due to less gas and more liquid produced at the expander outlet phase separator.

2. Power recovery from the expansion engine plus the fricition losses in the running gear, calculated back as an enthalpy drop in the fluid as follows:

| | | |
|---|---|---|
| Recovered electrical power | | 7.83 kW |
| Measured frictional & electrical losses | | 8.95 kW |
| Total gas power | = | 16.79 kW |
| Heat removal | = | $\frac{16.79 \text{ kW} \times 3600 \text{ kJ/kW} - \text{hr}}{1364 \text{ kg/hr (engine flow rate)}}$ |
| | = | 44.3 kJ/kg |
| Enthalpy in | = | =57.6 kJ/kg |
| Enthalpy ideal | = | −109 kJ/kg |
| Efficiency | = | $\frac{\text{actual work}}{\text{ideal work}}$ |
| | = | $\frac{44.3 \text{ kJ/kg}}{(109 - 57.6)\text{kJ/kg}} \times 100 = 86\%$ |

3. Pressure-Volume indicator card comprising the actual area within the card to the ideal area shows the approximately 87% of the useful fluid energy was transmitted to the piston.

The results of these tests indicates the engine achieves in excess of 85% adiabatic efficiency.

The fluid in the inlet to the expansion engine is super critical, i.e.; fluid pressure is above critical pressure and fluid temperature is below critical temperature and the fluid density is approximately the same as liquid density. The thermodynamic properties of the inlet fluid indicate that this fluid has little or no compressibility, in other words, the inlet fluid behaves like a liquid.

Figure 5:
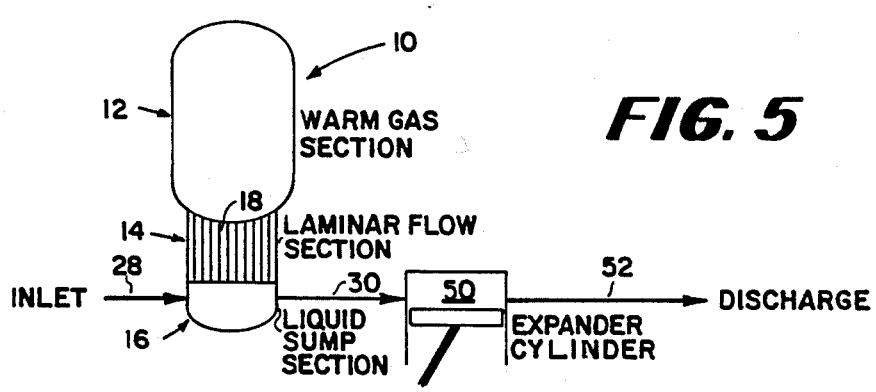
FIG. 5 is a schematic diagram for surge bottle - engine cycle system.

This means that the inlet piping system to an expansion engine had to be similar to the inlet piping system for a reciprocating liquid pump. There had to be a surge or pulsation damper in the inlet pipe, close to the cylinder to keep the velocity and acceleration head loss in the inlet pipe to a minimmum. FIG. 5 shows a schematic representative of the surge bottle system.

To function properly, the design and operation of the inlet surge bottle meets the following criteria.

1. Lowest practical and economical pulsation level possible. Preferably less than 5% of total pressure drop in the engine inlet line.

2. Determine warm gas temperature and volume of warm gas chamber relative to the cold liquid sump to meet requirements of item 1.

3. Determine configuration (type flow channel), flow channel cross section and length to keep the heat transfer from the warm section to the liquid sump to a minimum.

4. Determined the type and size of the warm gas chamber insulation to keep the proper warm temperature and keep the heat leak to the cryostat cold atmosphere to a minimum.

5. The inlet surge bottle must fit inside the expansion engine cold end cryostat.

Figure 6:
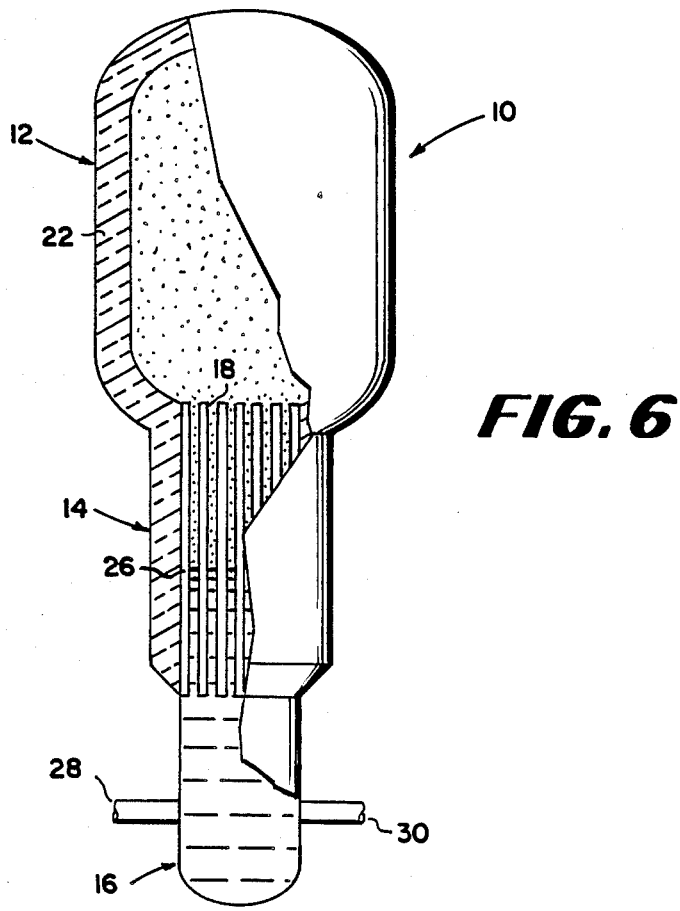
FIG. 6 is a detailed diagram of the surge bottle of the present invention.

In order to meet the above criteria, the surge bottle of the present invention, which is illustrated in FIG. 6, was devised. With reference to FIG. 6, the surge bottle 10 comprises a single vessel with three sections: liquid sump section 16, which is an enclosed volume containing an incompressible fluid, e.g. liquid or dense fluid; and warm gas volume section 12, which is an enclosed volume containing a compressible warm gas. Liquid sump section 16 and warm gas volume section 12 are connected by laminar flow section 14 disposed there between which is comprised of a bundle of small bore, thin walled tubes 18 which contain and inventory of the incompressible fluid in the ends connected to liquid sump section 16 and the warm compressible gas in the ends connected to warm gas volume seciton 12. These two fluid have an interface, shown as 26, in tubes 18 of laminar flow section 14.

Laminar flow section 14 is the key to a successful operation of surge bottle 10. Section 14 which is comprised of a bundle of small bore, thin walled tubes 18 where the fluids (the incompressible fluid and the warm compressible gas) move or oscillate a short distance within each of tubes 18 with each stroke of an expander to which surge bottle 10 would be connected when in operation.

To minimize the heat leak into the liquid in the sump, the heat conducted through the metal must be extremely low, and the mixing of warm compressible gas into the incompressible fluid must be eliminated. This is met by making the bore of tubes 18 a size (e.g. a bore diameter of approximately 0.345 inches [1.35 mm]) such that the flow of either fluid in tubes 18 is laminar, i.e., little or no mixing of warm compressible gas and the cold incompressible fluid as interface 26 of the fluids in laminar flow section 14 tubes 18 oscillate in phase with the expansion engine piston.

The design warm gas temperature in section 12 should be preferably at least 55° C. warmer than the incompressible fluid in section 16 to meet the required pulsaiton level of less than 5%. During operation, the warm gas temperature can be maintained close to 55° C. warmer than the liquid without adding warm or cold gas to the warm gas chamber. Non-ideal recompression and expansion of the gas within the surge bottle provides the heat to offset the heat leak out of the bottle.

To keep the warm gas temperture at the required temperature difference, insulation 22 is required. This insulation 22 keeps the warm gas from being cooled by the surrounding gas which is at the same temperature as the liquid in sump section 16. The insulation 22 envelopes those surfaces of the warm compressible gas section 12 and the laminar flow section 14 which are not in communication with each other or the liquid sump section 16.

The working sequence for inlet surge bottle is best demonstrated with reference to FIG. 5. In FIG. 5, surge bottle 10 is connected to and preceeds expander cylinder 50. In the working sequence, during the engine cylinder fill stroke (i.e., the expansion portion of the cycle), the incompressible fluid is drawn from liquid sump section 16 of surge bottle 10 into expander cylinder 50 via outlet line 30 thereby creating a low pressure in sump section 16. During this part of the cycle, fresh incompressible fluid from the liquefraction process in which the system would be utilized flows into sump 16 through inlet line 28 and the warm gas in section 12 expands forcing the incompressible fluid from laminar flow section 14 into the sum 16 to equalize the pressure between sections 12 and 16.

During the cylinder discharge stroke (i.e., the return portion of the cycle), the inlet to expander cylinder 50 is closed (i.e., flow to cylinder 50 is zero) and the fluid in expander cylinder 50 is removed via line 52. During this part of the cycle, fresh incompressible fluid from the liquefaction process via inlet line 28 flows into the liquid sump 16 and back into tubes 18 of laminar flow section 14 as the warm gas pressure in section 12 returns to design level and the cycle is ready to repeat.

Field test data for the surge bottle of the present invention indicate that it will operate with less than 5% peak to peak inlet pressure pulsation compared to approximately a 15% peak to peak inlet pressure pulsation for a conventional surge bottle. This reduction in pulsation results in higher expansion engine isentropic efficiency and lower power per unit of liquid produced.

Although the present invention may have been described with reference to specific embodiments thereof, these embodiments should not be viewed as limitations of the invention. The scope and limits of the the present invention should be ascertained by the following claims:

I claim:

1. A surge bottle or pressure pulsation dampening device for cryogenic services which comprises:
   (a) a liquid sump section, wherein the liquid sump section is comprised of an enclosed area containing a volume of an incompressible fluid;
   (b) a warm gas volume section, wherein the warm gas volume section is comprised of an enclosed area containing a volume of a compressible warm gas; and
   (c) a laminar flow section which connects and allows for communication between the liquid sump section and the warm gas volume section, wherein the laminar flow section is comprised of a number of small bore, thin walled tubes which contain the incompressible fluid in the end connected to the liquid sump section and the compressible warm gas in the end connected to the warm gas volume section wherein the bore of the tubes are such that any movement of the either the compressible warm gas or the incompressible fluid would be laminar flow; whereby, during operation, the incompressible fluid and the warm compressible gas within the small bore, thin walled tubes move or oscillate a short distance in each of the tubes with minimal intermixing of the incompressible fluid and the warm compressible gas thereby minimizing heat leak from the warm gas volume section to the liquid sump section into the liquid in the sump.

2. The device of claim 1 wherein the warm gas temperature is at least 55° C. warmer than the incompressible fluid temperature.

* * * * *